United States Patent

Tokui et al.

Patent Number: 5,842,505
Date of Patent: Dec. 1, 1998

[54] MULTI-LAYER PIPE

[75] Inventors: Shin Tokui; Masaki Kohyama, both of Yamaguchi, Japan

[73] Assignee: Mitsui Petrochemical Industries, Ltd., Tokyo, Japan

[21] Appl. No.: 708,966

[22] Filed: Sep. 6, 1996

[30] Foreign Application Priority Data

Sep. 7, 1995 [JP] Japan .................................. 7-229948

[51] Int. Cl.$^6$ ........................................................ F16L 7/14
[52] U.S. Cl. .......................... 138/140; 138/137; 428/35.7
[58] Field of Search ..................................... 138/140, 141, 138/137; 428/35.7, 35.9

[56] References Cited

U.S. PATENT DOCUMENTS

| | | |
|---|---|---|
| 4,579,900 | 4/1986 | Chatterjee et al. . |
| 4,791,143 | 12/1988 | Tanaka et al. ............................ 521/89 |
| 4,918,111 | 4/1990 | Tanaka et al. ............................ 521/89 |

FOREIGN PATENT DOCUMENTS

| | | |
|---|---|---|
| 0174611 | 3/1986 | European Pat. Off. . |
| 0425820 | 5/1991 | European Pat. Off. . |

*Primary Examiner*—Patrick F. Brinson
*Attorney, Agent, or Firm*—Sherman and Shalloway

[57] ABSTRACT

A multi-layer pipe has an innermost layer formed of a butene polymer composition. At least one other layer is formed of a polyolefin resin composition comprising (A) 95–5 parts by weight of a polyolefin resin, (B) 5–95 parts by weight of a filler, and (C) 0.1–10 parts by weight per 100 parts by weight of components (A) and (B) combined of a modified polyolefin resin. This multi-layer pipe undergoes minimal elongation by heat so that it is free from troubles by thermal deformation even when high temperature fluid is passed therethrough, has high rigidity, and is thus suitable as plumbing for cold and hot water.

7 Claims, 1 Drawing Sheet

MULTI-LAYER PIPE

BACKGROUND OF THE INVENTION

1. Field of the Invention

This invention relates to a multi-layer pipe and more particularly, to a multi-layer pipe which undergoes minimal elongation by heat so that it is free from troubles by thermal deformation even when high temperature fluid is passed therethrough, has high rigidity, and is thus suitable as plumbing for cold and hot water.

2. Prior Art

In recent years, pipes of synthetic resin have been widely used as plumbing for cold and hot water in buildings because they have many advantages including corrosion resistance, hygienic safety, light weight, and ease of manufacture to large diameters. For example, research engineers have strove to develop pipes of poly-1-butene resins as plumbing for cold and hot water because poly-1-butene resins are improved in hygienic safety, pressure resistant strength, long-term durability at high temperatures (40° to 120° C.), and especially, durability against internal pressure creep.

The pipes of poly-1-butene resins, however, undergo substantial thermal elongation due to thermal expansion like pipes of other resins. Particularly when vertically or horizontally extending pipes must be firmly secured at intermediate positions by attaching fasteners, it becomes difficult to accommodate the elongation of pipes due to thermal expansion. If high temperature fluid is passed through such pipes, there is the risk that buckling deformation occur due to thermal expansion. Also, since pipes made of synthetic resins such as poly-1-butene resin are generally less rigid as compared with metallic pipes, many supports must be provided midway the horizontal piping, rendering the plumbing operation cumbersome.

SUMMARY OF THE INVENTION

Therefore, an object of the invention is to provide a multi-layer pipe which undergoes minimal elongation by heat so that it is free from troubles by thermal deformation even when high temperature fluid is passed therethrough, has high rigidity, and is thus suitable as plumbing for cold and hot water.

The inventors have found that a pipe of a multi-layer structure comprising a layer of a butene polymer or a butene polymer composition as the innermost layer and at least one layer of a polyolefin resin composition containing a polyolefin resin, a filler, and a modified polyolefin resin is minimized in thermal expansion, elongation, and deformation. Additionally, the pipe is fully rigid. The pipe is thus suitable as plumbing for cold and hot water.

According to the present invention, there is provided a multi-layer pipe comprising at least two layers wherein the innermost layer is formed of a butene polymer composition and at least one layer other than the innermost layer is formed of a polyolefin resin composition comprising (A) 95 to 5 parts by weight of a polyolefin resin, (B) 5 to 95 parts by weight of a filler, and (C) 0.1 to 10 parts by weight per 100 parts by weight of components (A) and (B) combined of a modified polyolefin resin.

BRIEF DESCRIPTION OF THE DRAWINGS

The only figure.

DETAILED DESCRIPTION OF THE INVENTION

Figure 1:
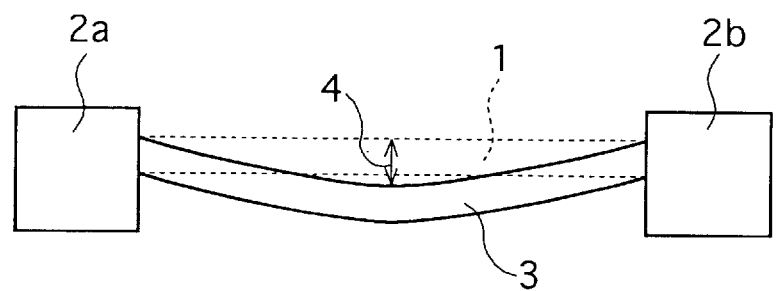
FIG. 1 illustrates how to measure a heat distortion of a multi-layer pipe.

The multi-layer pipe of the invention includes at least two layers. The innermost layer is formed of a butene polymer composition and at least one other layer is formed of a polyolefin resin composition.

The butene polymer composition of which the innermost layer is made is a composition comprising a butene polymer as a major ingredient. The composition may be a butene polymer alone or a mixture of a butene polymer with another polymer. The butene polymer includes a homopolymer of 1-butene and copolymers of 1-butene with other α-olefins having 2 to 20 carbon atoms. Examples of the other α-olefins having 2 to 20 carbon atoms include ethylene, propylene, 1-pentene, 4-methyl-1-pentene, 1-hexene, 1-octene, 1-decene, 1-tetradecene, and 1-octadecene. One or more of the other α-olefins may be incorporated in the butene polymer. Typically the butene polymer contains at least about 80 mol %, preferably at least about 90 mol % of 1-butene.

The butene polymer composition generally contains about 10 to 90% by weight, preferably about 30 to 70% by weight of a butene polymer. The ingredients of the butene polymer composition other than the butene polymer include other polymers such as polyolefins, nylon, and acrylonitrile-butadiene-styrene copolymers (ABS). When the butene polymer composition contains the other polymer, the content of the other polymer is usually about 5 to 80% by weight. Preferred polyolefins are polymers and copolymers of ethylene and/or propylene, especially ethylene-α-olefin copolymers and propylene-α-olefin copolymers. Examples of the α-olefin which can be used herein include ethylene, propylene, 1-butene, 1-hexene, 1-heptene, 1-pentene, 4-methyl-1-pentene, 1-octene, 1-decene, 1-tetradecene, and 1-octadecene.

In addition to the butene polymer and other polymer, the butene polymer composition may further contain heat resistant stabilizers, anti-fungas agents and other additives.

In the multi-layer pipe of the present invention, at least one layer other than the innermost layer is formed of a polyolefin resin composition comprising (A) a polyolefin resin, (B) a filler, and (C) a modified polyolefin resin.

The polyolefin resin used as component (A) of the polyolefin resin composition includes homopolymers of α-olefins having 2 to 20 carbon atoms and copolymers of two or more α-olefins. Copolymers of an α-olefin with another monomer are also acceptable as polyolefin resin (A). Examples of the α-olefin having 2 to 20 carbon atoms include ethylene, propylene, 1-butene, 1-hexene, 1-heptene, 1-pentene, 4-methyl-1-pentene, 1-octene, 1-decene, 1-tetradecene, and 1-octadecene. Other monomers copolymerizable with the α-olefin include cycloalkenes and cycloalkadienes which can be used alone or in admixture of two or more. The polyolefin resin should preferably contain at least about 80 mol %, more preferably at least about 90 mol % of the α-olefin. Exemplary polyolefin resins are polyethylene, polypropylene, poly 1-butene and poly(4-methyl-1-pentene).

The polyolefin resin should preferably have a melt flow rate (MFR) of about 0.01 to 50 g/10 min. A melt flow rate of about 0.05 to 20 g/10 min. is more preferred when ease of injection or extrusion molding and mechanical properties are considered. The melt flow rate (MFR) used herein is measured according to ASTM D1238, E.

With respect to the molecular weight distribution, the polyolefin resin should preferably have a ratio (Mw/Mn) of weight average molecular weight (Mw) to number average molecular weight (Mn) of from about 2/1 to about 15/1. A ratio Mw/Mn of from about 3/1 to about 8/1 is preferred for impact strength.

Component (B) of the polyolefin resin composition is a filler which may be either organic or inorganic. Aramide fibers are typical of the organic filler. Exemplary inorganic fillers are glass fibers, carbon fibers, talc, calcium carbonate, and barium sulfate. These fillers may be used alone or in admixture of two or more. At least one filler selected from the group consisting of aramide fibers, glass fibers, carbon fibers, talc, calcium carbonate, and barium sulfate is preferred for reinforcement. The glass fibers may be roving and chopped strands, for example, with the chopped strands being preferred because of uniform dispersion in resins and enhanced reinforcement. The glass fibers should preferably have a diameter of about 6 to 15 μm, especially about 10 to 13 μm and a length of about 2 to 7 mm, especially 3 to 6 mm although these dimensions are not critical.

In the polyolefin resin composition, polyolefin resin (A) and filler (B) are contained in a weight ratio between 5/95 and 95/5. Particularly when glass fibers are used as the filler, a weight ratio (A)/(B) between 65/35 and 90/10 is preferred because polyolefin resin compositions having an improved profile of rigidity and impact strength are obtainable.

Component (C) of the polyolefin resin composition is a modified polyolefin resin which comprises a polyolefin resin graft copolymerized with a grafting monomer. The polyolefin rein constituting the skeleton of the modified polyolefin resin may be identical with or different from the above-mentioned polyolefin resin (A). A propylene polymer graft copolymerized with a grafting monomer is especially preferred as the modified polyolefin resin.

The propylene polymer used herein includes a propylene homopolymer, block copolymers of propylene with less than 50 mol % of another α-olefin, typically having 2 to 20 carbon atoms such as ethylene, 1-butene, 4-methyl-1-pentene, 1-hexene, 1-octene, 1-decene, and 1-tetradecene and mixtures thereof, and crystalline random copolymers of propylene with less than 10 mol % of another α-olefin. The propylene-α-olefin block copolymers encompass copolymers obtained by successively polymerizing olefin monomers in a single polymerization system in the presence of a stereoregulated polymerization catalyst while changing the monomer composition whereby respective polymers are not always copolymerized, known as non-polymer blend type copolymers.

Examples of the grafting monomer incorporated in the modified polyolefin resin include unsaturated carboxylic acids and derivatives thereof, such as maleic acid, maleic anhydride, acrylic acid, fumaric acid, tetrahydrophthalic acid, itaconic acid, citraconic acid, and crotonic acid and mixtures thereof. The modified polyolefin resin preferably has a grafting modification of about 0.05 to 8% by weight, more preferably about 0.1 to 4% by weight. The term grafting modification is a grafting monomer content in the modified polyolefin resin.

The modified polyolefin resin can be prepared by graft copolymerizing any desired polyolefin resin with a grafting monomer by conventional well-known techniques. For example, graft copolymerization may be effected by adding a grafting monomer to a molten polyolefin resin or by adding a grafting monomer to a solution of a polyolefin resin in a suitable solvent. In either technique, reaction is preferably carried out in the presence of a radical polymerization initiator in order to achieve efficient graft copolymerization of the grafting monomer to the polyolefin resin. The reaction temperature is typically about 60° to 350° C. The radical polymerization initiator used herein includes organic peroxides, organic perester compounds and azo compounds. Examples of the organic peroxide include benzoyl peroxide, dichlorobenzoyl peroxide, dicumyl peroxide, di-t-butyl peroxide, 2,5-dimethyl-2,5-di(peroxibenzoate)hexine-3, 1,4-bis(t-butylperoxyisopropyl)benzene, lauroyl peroxide, 2,5-dimethyl-2,5-di(t-butylperoxy)hexine-3, and 2,5-dimethyl2,5-di(t-butylperoxy)hexane. Examples of the organic perester include t-butylperbenzoate, t-butylperacetate, t-butylperphenylacetate, t-butylperisobutyrate, t-butylpersec-octoate, t-butylperpivalate, cumylperpivalate, and t-butylperdiethylacetate. These radical polymerization initiators may be used alone or in admixture of two or more. Preferred among others are dialkyl peroxides such as dicumyl peroxide, di-t-butyl peroxide, 2,5-dimethyl-2,5-di (t-butylperoxy)hexine-3, 2,5-dimethyl-2,5-di(t-butylperoxy) hexane, and 1,4-bis(t-butylperoxyisopropyl)benzene. The radical polymerization initiators are generally used in amounts of 0.001 to 1 part by weight per 100 parts by weight of the polyolefin resin.

The content of the modified polyolefin resin (C) in the polyolefin resin composition is about 0.1 to 10 parts by weight per 100 parts by weight of components (A) and (B) combined. The modified polyolefin resin content is preferably about 0.5 to 5 parts by weight because a good profile of mechanical properties and long-term durability is expectable.

To prevent oxidation, the polyolefin resin composition may contain antioxidants which are commonly added to polyolefins. Exemplary antioxidants are phenolic and phosphorus antioxidants alone or in admixture. Examples include 2,6-t-butyl-4-hydroxybenzoate, n-hexadecyl-3,5-di-t-butyl-4-hydroxybenzoate, 1,3,5-trimethyl-2,4,6-tris(3,5-di-t-butyl-4-hydroxybenzyl)benzene, 1,3,5-tris(4-t-butyl-3-hydroxy-2,6-dimethylphenyl)isocyanate, tris(3,5-di-t-butyl-4-hydroxyphenyl)isocyanate, n-octadecyl-3(3,5-di-t-butyl-4-hydroxyphenyl)propionate, nickel salt of bis(3,5-di-t-butyl-4-hydroxybenzoylphosphonic acid) monoethyl ester, 2,2'-dihydroxy-3,3'-di(α-methylcyclohexyl)-5,5'-dimethyldiphenylmethane, 4,4-thio-bis(3-methyl-6-t-butyl-phenol), 1,1,3-tris(2-methyl-4-hydroxy-5-t-butyl-phenyl) butane, tetrakis[methylene-3(3,5-di-t-butyl-4-hydroxyphenyl)propionate]methane, 2,6-di-t-butyl-p-cresol, 4,4'-methylene-bis(2,6-di-t-butyl-phenol), tris(2,4-di-t-butylphenyl)phosphite, and vitamin E. Where the polyolefin resin composition may contain an antioxidant, its content is preferably about 0.1 to 2.0 parts, more preferably about 0.5 to 1.8 parts by weight per 100 parts by weight of the polyolefin resin, filler and modified polyolefin resin combined.

In addition to the antioxidant, the polyolefin resin composition of the invention may further contain additives such as UV absorbers, mildew-proofing agents, anti-rust agents, lubricants, pigments, and heat resistance stabilizers insofar as the objects of the invention are not impaired.

Further, olefinic elastomers such as polyethylene and polystyrene may be added to the polyolefin resin composition in order to improve the moldability thereof and regulate the physical properties thereof insofar as the objects of the invention are not impaired. The content of the olefinic elastomer is preferably up to 20 parts by weight per 100 parts by weight of the polyolefin resin.

The multi-layer pipe of the invention may have one or more layers of a polyolefin resin composition. Exemplary structures are a three-layer structure consisting of an innermost layer of a butene polymer composition and intermediate and outer layers of a polyolefin resin composition, and a three-layer structure consisting of an innermost layer of a butene polymer composition, an intermediate layer of a polyolefin resin composition, and an outer layer of a butene polymer composition.

The multi-layer pipe of the invention preferably has an outer diameter of about 10 to 220 mm and a wall thickness of about 0.5 to 44 mm. The ratio of outer diameter to thickness is preferably from abut 5/1 to about 20/1. The wall thickness or thickness is properly determined in accordance with the temperature and pressure of fluid to be passed therethrough. The ratio of the thickness of a butene polymer composition layer to the thickness of a polyolefin resin composition layer is properly determined in accordance with the temperature and pressure of fluid to be passed therethrough although it is preferably from about 0.05/1 to about 20/1. In the case of a three-layer structure consisting of an innermost layer of a butene polymer composition and intermediate and outer layers of a polyolefin resin composition, the ratio in thickness of innermost/intermediate/outer layer is preferably (0.1–20)/1/(0.1–20). In the case of a three-layer structure consisting of an innermost layer of a butene polymer composition, an intermediate layer of a polyolefin resin composition, and an outer layer of a butene polymer composition, the ratio in thickness of innermost/intermediate/outer layer is preferably (0.1–20)/1/(0.1–20).

In the multi-layer pipe of the invention, there are present 30 to 5,000 parts by weight of the polyolefin resin composition of which at least one other layer is made per 100 parts by weight of the butene polymer composition of which the innermost layer is made. With respect to the content of the polyolefin resin composition in the multi-layer pipe of the invention, the polyolefin resin composition preferably occupies 5 to 95%, more preferably 10 to 90%, most preferably 20 to 80% of the total thickness.

There has been described a multi-layer pipe which undergoes minimal elongation by heat so that it is free from troubles by thermal deformation even when high temperature fluid is passed therethrough. Additionally the pipe has high rigidity. Therefore, the pipe is suitable as plumbing for cold and hot water.

EXAMPLES

Examples of the present invention are given below by way of illustration and not by way of limitation.

Examples 1–2

Preparation of Poly-1-Butene Resin Composition

A poly-1-butene resin composition was prepared by mixing 84 parts by weight of a poly-1-butene resin (P5050, manufactured by Mitsui Petrochemical Industries, Ltd. 1-butene homopolymer, MFR: 0.5 g/10 min.), 1 part by weight of maleic anhydride-modified polypropylene resin (modification with maleic anhydride: 3% by weight), and 15 parts by weight of glass fibers (GRS-3A, manufactured by Asahi Fiber Glass K.K., mean fiber diameter 13 μm, mean fiber length 3 mm) and milling the molten mixture in a twin-screw extruder at a molding temperature of 200° C.

Preparation of Three-Layer Pipe

Using the poly-1-butene resin composition and the poly-1-butene resin (P5050, manufactured by Mitsui Petrochemical Industries, Ltd.), two types of three-layer pipes having an outer diameter of 22 mm and a thickness of 2.4 mm were prepared by means of a two-type, three-layer pipe molding machine. The pipe of Example 1 had outer, intermediate and inner layers which were formed of the poly-1-butene resin, the poly-1-butene resin composition, and the poly-1-butene resin and had a thickness of 0.9 mm, 0.6 mm, and 0.9 mm, respectively. The pipe of Example 2 had outer, intermediate and inner layers were formed of the poly-1-butene resin, the poly-1-butene resin composition, and the poly-1-butene resin and had a thickness of 0.6 mm, 1.2 mm, and 0.6 mm, respectively.

The three-layer pipes were measured for yield stress, tensile strength, Young's modulus, elongation, hydraulic pressure at rupture, flexural modulus, and heat distortion by the following tests. The results are shown in Table 1.

Yield Stress, Tensile Strength, Young's Modulus, Elongation

Measurement was made according to JIS K7113 and K6778.

Flexural Modulus

Measurement was made according to JIS K7203.

Hydraulic Pressure at Rupture

A pipe of 50 cm long was plugged at one end, filled with water at room temperature, provided at the other end with a check valve. Water at room temperature was introduced at a rate of 550 cm$^3$/min. into the pipe through the check valve. The hydraulic pressure at rupture was a pressure at which the pipe was ruptured.

Heat Distortion

As shown in FIG. 1, a pipe 1 of 80 cm long was horizontally held between fixtures 2a and 2b at room temperature (15° C.). The assembly was set in an oven. The oven was heated at a heating rate of 30° C./10 min. to 50° C., 70° C., 90° C. or 95° C. whereupon the pipe was maintained at the temperature for 5 minutes. At each temperature, the pipe 3 was thermally elongated and slacked. A heat distortion 4 was measured as the distance between the initial pipe 1 and the heated pipe 3.

Comparative Example 1

A pipe was formed solely of the same poly-1-butene resin as used in Example 1 to the same size as in Example 1. The pipe was measured for yield stress, tensile strength, Young's modulus, elongation, hydraulic pressure at rupture, flexural modulus, and heat distortion as in Example 1. The results are shown in Table 1.

Comparative Example 2

A pipe was formed solely of the same poly-1-butene resin composition as used in Example 1 to the same size as in Example 1. The pipe was measured for yield stress, tensile strength, Young's modulus, elongation, hydraulic pressure at rupture, flexural modulus, and heat distortion as in Example 1. The results are shown in Table 1.

TABLE 1

|  | E1 | E2 | CE1 | CE2 |
|---|---|---|---|---|
| thickness (mm) | | | | |
| Outer layer | 0.9 | 0.6 | 2.4 | 0 |
| Intermediate | 0.6 | 1.2 | 0 | 2.4 |
| Inner layer | 0.9 | 0.6 | 0 | 0 |
| Yield stress (kg/cm$^2$) | 220 | — | 190 | — |
| Tensile strength (kg/cm$^2$) | 225 | 275 | 310 | 500 |
| Young's modulus (kg/cm$^2$) | 5700 | 7300 | 3100 | 12000 |
| Elongation (%) | 77 | 23 | 180 | 15 |
| Hydraulic pressure at rupture (kg/cm$^2$) | 53 | 53 | 56 | 35 |
| Flexural modulus (kg/cm$^2$) | | | | |
| at 23° C. | 3000 | 3300 | 2200 | 4000 |
| at 60° C. | 1800 | 2100 | 1400 | 2700 |
| at 95° C. | 1200 | 1400 | 900 | 1800 |
| Heat distortion (mm) | | | | |
| at 15° C. | 0 | 0 | 0 | 0 |
| at 50° C. | 6 | 0 | 19 | 0 |
| at 70° C. | 12 | 4 | 27 | 0 |
| at 90° C. | 17 | 8 | 34 | 0 |
| at 95° C. | 19 | 10 | 37 | 0 |

As shown in Table 1, the pipe solely of the poly-1-butene resin composition (glass fiber-reinforced poly-1-butene resin) of Comparative Example 2 experiences little heat distortion, but lower in pressure resistant strength (hydraulic pressure at rupture) than the pipes of Examples 1 and 2 and Comparative Example 1 due to the orientation of glass fibers. The pipe of Comparative Example 2 is thus unsuitable for plumbing.

The pipes of Examples 1 and 2 are comparable in pressure resistant strength to the pipe of Comparative Example 1 and lower in heat distortion than the pipe of Comparative Example 1. Because of the minimized heat elongation, the pipes of Examples 1 and 2 are suitable for plumbing.

Although some preferred embodiments have been described, many modifications and variations may be made thereto in the light of the above teachings. It is therefore to be understood that within the scope of the appended claims, the invention may be practiced otherwise than as specifically described.

What is claimed is:

1. A multi-layer pipe comprising at least two layers wherein
    the innermost layer is formed of a butene polymer composition and
    at least one layer other than said innermost layer is formed of a polyolefin resin composition comprising (A) 95 to 5 parts by weight of a polyolefin resin, (B) 5 to 95 parts by weight of a filler, and (C) 0.1 to 10 parts by weight per 100 parts by weight of components (A) and (B) combined of a modified polyolefin resin.

2. The multi-layer pipe of claim 1 wherein said filler (B) is at least one member selected from the group consisting of aramide fibers, glass fibers, carbon fibers, talc, calcium carbonate, and barium sulfate.

3. The multi-layer pipe of claim 1 wherein 30 to 5,000 parts by weight of the polyolefin resin composition of which said at least one layer other than said innermost layer is formed is present per 100 parts by weight of the butene polymer composition of which said innermost layer is formed.

4. The multi-layer pipe of claim 1 wherein the butene polymer composition comprises a butene polymer containing at least 80 mol % of 1-butene.

5. The multi-layer pipe of claim 1 wherein the polyolefin resin (A) contains at least 80 mol % of an alpha-olefin.

6. The multi-layer pipe of claim 1 wherein the modified polyolefin resin (C) comprises a propylene polymer graft copolymerized with a grafting monomer.

7. The multi-layer pipe of claim 1 having a three layer structure consisting of an inner layer of a butene polymer composition, an intermediate layer of a polyolefin resin composition, and an outer layer of a butene polymer composition, the ratio in thickness of the inner layer/intermediate layer/outer layer being (0.1–20)/1/(0.1–20).

* * * * *